(12) United States Patent
Vaccari

(10) Patent No.: US 10,078,852 B2
(45) Date of Patent: Sep. 18, 2018

(54) PREDICTING LOCATIONS AND MOVEMENTS OF USERS BASED ON HISTORICAL LOCATIONS FOR USERS OF AN ONLINE SYSTEM

(71) Applicant: Facebook, Inc., Menlo Park, CA (US)

(72) Inventor: Andrea Vaccari, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/586,306

(22) Filed: Dec. 30, 2014

(65) Prior Publication Data
US 2016/0189228 A1    Jun. 30, 2016

(51) Int. Cl.
*G06Q 30/02* (2012.01)
*H04W 4/021* (2018.01)

(52) U.S. Cl.
CPC ..... *G06Q 30/0261* (2013.01); *G06Q 30/0269* (2013.01); *H04W 4/021* (2013.01)

(58) Field of Classification Search
CPC .................................................. G06Q 30/026
USPC .......................................................... 707/724
See application file for complete search history.

(56) References Cited

U.S. PATENT DOCUMENTS

| | | | | |
|---|---|---|---|---|
| 8,073,460 | B1 * | 12/2011 | Scofield ................. | G06Q 30/02 455/414.1 |
| 2009/0197582 | A1 | 8/2009 | Lewis et al. | |
| 2011/0276565 | A1 * | 11/2011 | Zheng ..................... | G01C 21/20 707/724 |
| 2011/0282571 | A1 | 11/2011 | Krumm et al. | |
| 2012/0030227 | A1 * | 2/2012 | Mital ................. | G06F 17/30867 707/767 |
| 2012/0108259 | A1 * | 5/2012 | Weiss .................. | G06Q 30/0261 455/456.1 |
| 2012/0130817 | A1 * | 5/2012 | Bousaleh ........... | G06Q 30/0261 705/14.58 |
| 2012/0310737 | A1 | 12/2012 | Song et al. | |
| 2013/0179267 | A1 | 7/2013 | Lee | |
| 2013/0226857 | A1 * | 8/2013 | Shim ..................... | G06N 5/048 706/52 |
| 2013/0246175 | A1 | 9/2013 | Bilange et al. | |

(Continued)

OTHER PUBLICATIONS

PCT International Search Report and Written Opinion, PCT Application No. PCT/US2015/067942, dated Apr. 18, 2016, eleven pages.

(Continued)

*Primary Examiner* — Rehana Perveen
*Assistant Examiner* — Hicham Skhoun
(74) *Attorney, Agent, or Firm* — Fenwick & West LLP

(57) ABSTRACT

An online system receives location information from a plurality of user devices used by users of the online system. The location information identifies a plurality of different locations at which each of the user devices was located. From the location information, a plurality of chains of locations visited by each of a plurality of users are extracted. The online system generates one or more location pairs based on the chain of locations, where each location pair includes a first location and a second location to which there is a high probability a user will travel if the user is located at the first location. The location pairs are used for a variety of applications, such as for advertising to users based on locations and for providing insights into the movements of users.

14 Claims, 3 Drawing Sheets

(56) References Cited

U.S. PATENT DOCUMENTS

2014/0278086 A1* 9/2014 San Filippo ....... G01C 21/3423
  701/527
2015/0208203 A1* 7/2015 Cao .................... G06F 17/3087
  455/456.3

OTHER PUBLICATIONS

Canadian Intellectual Property Office, Office Action, Canadian Patent Application No. 2,971,737, dated Apr. 26, 2018, three pages.

* cited by examiner

PREDICTING LOCATIONS AND MOVEMENTS OF USERS BASED ON HISTORICAL LOCATIONS FOR USERS OF AN ONLINE SYSTEM

BACKGROUND

This disclosure relates generally to location services, and in particular to predicting locations of users based on correlations with previous locations and movement patterns of a set of users of the online system.

Businesses often use behaviors of their customers to influence services provided to the customers. In particular, businesses gain valuable insight into customers at a given location by determining where the customers have previously been located and predicting where the customers will be located in the future. For example, by predicting where customers will be located in the future, a business can predict flow of customers through a location associated with the business, target advertising or promotions to customers, or anticipate demand for customer service at a particular location. However, it is difficult for businesses to determine locations previously visited by customers. Accordingly, it is difficult for businesses to accurately predict future locations of the customers in order to provide services to the customers.

SUMMARY

An online system determines correlations of pairs of locations visited by users of the online system. The online system receives location information from a plurality of users devices used by the users of the online system, which identifies a plurality of different locations at which each of the user devices was located. The online system uses the location information to determine locations visited by the users and amounts of time spent by the users at each location, where a user may be determined to have visited a location if the user's user device was located at the location for at least a threshold length of time. Using the location information, the online system extracts a plurality of chains of locations visited by users of the online system. Each chain is a sequential list of locations visited by a user, and may include one or more locations of a similar type (such as a list of cities visited by a user, a list of stores visited by a user, or a list of areas within a building visited by a user). Based on the chains of locations, the online system generates one or more location pairs. If a pair of locations were visited too far apart in time (e.g., more than a threshold time), the system may ignore the pair. Each location pair includes a first location and a second location to which there is a high probability a user will travel if the user is located at the first location. The location prediction may be ordered, in which it predicts a second location only when the first location was visited before the second location, or it may be unordered, in which it predicts a second location visited if the first location is visited before or after the second location.

The location predictions may be used for a variety of applications. For example, the online system selects an advertisement for presentation to a user based on the location pairs. For example, if a user is located at one of the locations in a pair, the online system selects an advertisement associated with the other location in the pair. The location prediction may also be surfaced to an advertiser, which may use the location prediction to craft targeting criteria for its advertisements (e.g., targeting ads to users who are at a particular location that is highly correlated with subsequent visits to related business establishments). The online system may additionally or alternatively send information about the location pairings to entities associated with the locations, enabling the entities to make business or marketing decisions based on one or more other locations paired to the entity's location. For example, if the locations are areas within a department store, the store manager can predict future demand for customer service based on current customer locations.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
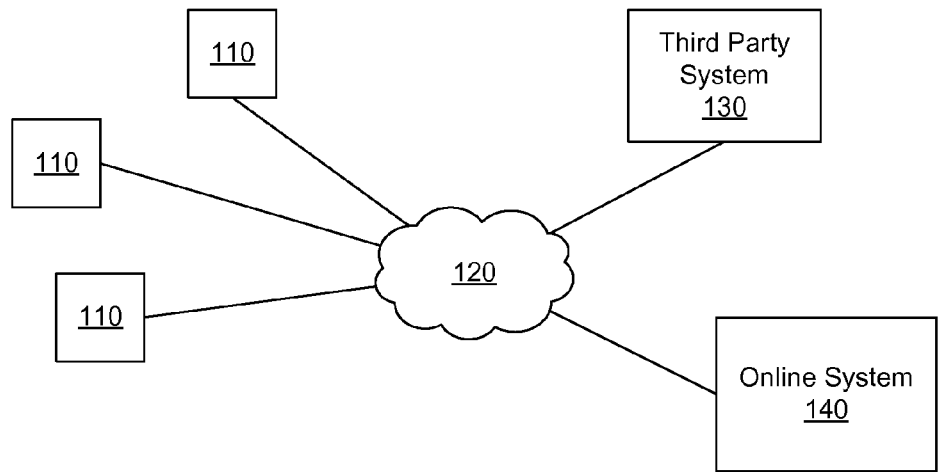
FIG. 1 is a block diagram of a system environment in which a social networking system operates, in accordance with an embodiment of the invention.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, the client devices 110 include location tracking functionality, and can identify the locations of the devices based on global positioning, IP address, triangulation to nearby cellular towers, or any other mechanism. In one embodiment, a user of the client device 110 can disable or opt out of location tracking on the device, and the client device 110 will not track the device's location.

In other cases, the client device 110 only tracks location if the user opts in to location tracking.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

Figure 2A:
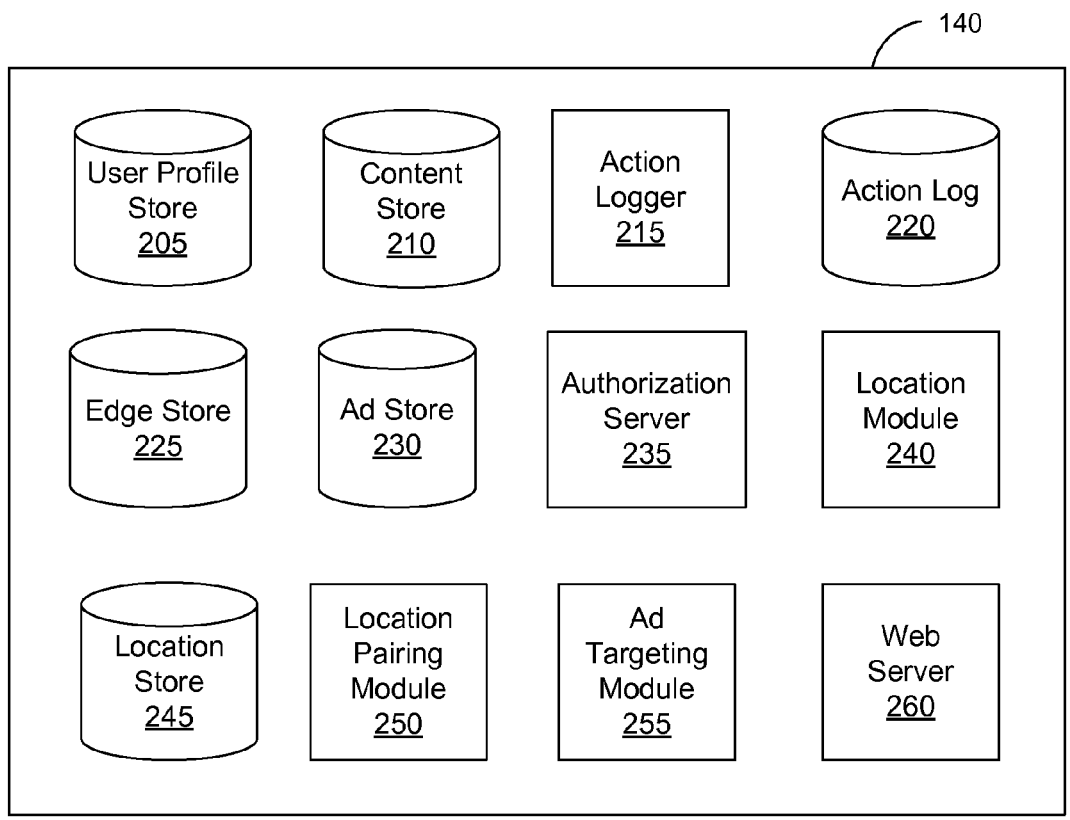
FIG. 2A is a block diagram of a social networking system, in accordance with an embodiment of the invention.

One or more third party systems 130 may be coupled to the network 120 for communicating with the online system 140, which is further described below in conjunction with FIG. 2A. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party website 130 may also communicate information to the online system 140, such as advertisements, content, or information about an application provided by the third party website 130. Other third party systems 130 are associated with entities having physical locations that may be visited by users of the online system 140.

An example system operating as the online system 140 is a social networking system. FIG. 2A is an example block diagram of an architecture of the online system 140 including social networking functionality. The online system 140 shown in FIG. 2A includes a user profile store 205, a content store 210, an action logger 215, an action log 220, an edge store 225, an ad store 230, an authorization server 235, a location module 240, a location store 245, a location pairing module 250, an ad targeting module 255, and a web server 260. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220. Furthermore, a user profile in the user profile store 205 may also store identifiers of physical locations visited by the corresponding user.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of a online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the social networking system, sharing a link with other users of the social networking system, and commenting on posts made by other users of the social networking system.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with content in the advertisement request. For example, targeting criteria are a filter to apply to fields of a user profile, edges, and/or actions associated with a user to identify users having user profile information, edges, or actions satisfying at least one of the targeting criteria. Hence, the targeting criteria allow an advertiser to identify groups of users matching specific targeting criteria, simplifying subsequent distribution of content to groups of users.

In one embodiment, the targeting criteria may specify actions or types of connections between a user and another user or object of the online system 140. The targeting criteria may also specify interactions between a user and objects performed external to the online system 140, such as on a third party system 130. For example, the targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria may identify users having a connection to another user or object or having a particular type of connection to another user or object. Furthermore, targeting criteria may also specify a location visited by a user. For example, the targeting criteria identifies a city, building, or room in which the user is or was located.

The authorization server 235 enforces one or more privacy settings of the users of the online system 140. A privacy setting of a user determines how particular information associated with a user can be shared, and may be stored in the user profile of a user in the user profile store 205 or stored in the authorization server 235 and associated with a user profile. In one embodiment, a privacy setting specifies particular information associated with a user and identifies the entity or entities with whom the specified information may be shared. Examples of entities with which information can be shared may include other users, applications, third party systems 130 or any entity that can potentially access the information. Examples of information that can be shared by a user include user profile information like profile photo, phone numbers associated with the user, user's connections, actions taken by the user such as adding a connection, changing user profile information, locations visited by the user, and the like.

The privacy setting specification may be provided at different levels of granularity. In one embodiment, a privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. Specification of the set of entities that can access particular information may also be specified at various levels of granularity. Various sets of entities with which information can be shared may include, for example, all users connected to the user, a set of users connected to the user, additional users connected to users connected to the user all applications, all third party systems 130, specific third party systems 130, or all external systems.

One embodiment uses an enumeration of entities to specify the entities allowed to access identified information or to identify types of information presented to different entities. For example, the user may specify types of actions that are communicated to other users or communicated to a specified group of users. Alternatively, the user may specify types of actions or other information that is not published or presented to other users.

The authorization server 235 includes logic to determine if certain information associated with a user can be accessed by a user's friends, third-party system 130 and/or other applications and entities. For example, a third-party system 130 that attempts to access a user's comment about a uniform resource locator (URL) associated with the third-party system 130 must get authorization from the authorization server 235 to access information associated with the user. Based on the user's privacy settings, the authorization server 235 determines if another user, a third-party system 130, an application or another entity is allowed to access information associated with the user, including information about actions taken by the user. For example, the authorization server 235 uses a user's privacy setting to determine if the user's comment about a URL associated with the third-party system 130 can be presented to the third-party system 130 or can be presented to another user. This enables a user's privacy setting to specify which other users, or other entities, are allowed to receive data about the user's actions or other data associated with the user.

The location module 240 determines locations of a client device 110 and stores the locations in a user's user profile. If the user of the client device 110 has opted in to location tracking, the location module 240 accesses the location determined by the client device 110 to determine a current location of the device. In one embodiment, the location module 240 periodically (e.g., every 15 minutes) samples locations of the client device 110 and stores the locations in the user's user profile. The location module 240 may retrieve the device's location from any location-sensing capabilities of the client device 110, including, for example, GPS, IP address, and cell phone tower triangulation.

In one embodiment, the location module 240 is configured to convert the raw location data received from a client device 110 to an entity or object of interest, which is determined to be a location visited by a user. For example, the location module 240 may access map data to identify, by reverse geocoding, an address corresponding to a location received from a client device 110. The address may include a street address, a city, a county, a state, and/or a country. The location module 240 may also identify a name of an entity at the address. For example, the location module 240 identifies an address visited by a user of a client device 110 as being an address of a store, and determines the name of the store at the address. For locations within a building (e.g., departments within a department store), the location module 240 may access map data provided by an entity associated with the building that converts locations received from a client device 110 to locations within the building. Thus, the location module 240 may define locations visited by users at a variety of different granularities, including cities, buildings, and locations within buildings. Furthermore, by converting raw location data to an entity or object of interest, the location module 240 aggregates samples of the location of a user device 110 collected from the same location.

Based on a number of samples collected at the same location, the location module 240 may determine an amount of time the user spent at the location. In one embodiment, the location module 240 stores locations visited by a user in the location store 245 (as an address, raw location data as received from the client device 110, or both) in association with a time stamp, an amount of time spent at the location, and a user identifier of the user.

The location pairing module 250 uses location data aggregated from a plurality of users of the online system 140 to generate pairings between locations. In one embodiment, a first location and a second location are paired if the location pairing module 250 determines there is a high probability a user will travel to the second location if the user is located at the first location. To generate the pairings, the location pairing module 250 extracts chains of locations visited by each of a plurality of users of the online system 140 from the location histories of the users. Each chain of locations represents a sequence of locations visited by a user of the online system 140 and includes two or more locations visited by the user. A chain of locations may include locations of the same type, such as two or more cities visited by the user or two or more buildings (e.g., stores) visited by the user. The location pairing module 250 may extract multiple chains of locations corresponding to the same raw location data. For example, if a user flies from an airport in city A to an airport in city B, the location pairing module 250 may extract one chain of location including city A's airport and city B's airport, and extract another chain of locations including city A and city B.

In one embodiment, the location pairing module 250 selects locations at which the user was located for longer than a threshold length of time and places two locations in the same chain if the user visited the two locations in less than a threshold length of time. In one embodiment, the threshold lengths of time for determining whether to include a location in a chain are adjusted depending on the type of locations in the chain. For larger locations, such as cities, a threshold for including the location in a chain may be longer than for smaller locations, such as buildings. For example, the location module 240 determines a user visited a city if the user was located in the city for at least twelve hours. Thus, if a user was located in a city for less than twelve hours (e.g., if the user had a two hour layover in a city while flying between two other cities), the location pairing module 240 does not include the city in a chain of locations. In contrast, the threshold for including a location in a chain for smaller locations may be a shorter length of time. For example, the location pairing module 250 determines a user visited a room or area in a building if the user was located in the room or area for at least five minutes, but does not include a room in a chain of locations if the user was in the room or area for a shorter period of time (e.g., if the user was walking through the room to reach a different room).

Similarly, the threshold for determining whether to include two locations in the same chain may be adjusted for different types of locations. For locations that are closer together, the location pairing module 250 may set a lower threshold for elapsed time between the two locations than for locations that are farther apart. For example, the location pairing module 250 includes two cities in a chain if the user visited the two cities within one day of each other. As another example, the location pairing module 250 includes two stores in a chain if the user visited the two stores within three hours of each other, but does not include the stores in a chain if the user visited the two stores on subsequent days.

The location pairing module 250 aggregates chains of locations visited by a plurality of users of the online system 140. In one embodiment, the location pairing module 250 filters the location chains to select chains including locations of a particular type or locations affiliated with a common entity. For example, the location pairing module 250 filters location chains to select chains including locations corresponding to stores within a specified city or within a specified geographical area. In another example, the location pairing module 250 filters location chains to select chains including locations affiliated with a common entity, such as rides in a theme park. As yet another example, the location pairing module 250 selects chains including locations within a particular building, such as departments within a department store or areas within a casino. In still another example, the location pairing module 250 selects chains including locations corresponding to cities. The location pairing module 250 may alternatively filter the locations based on other parameters of the locations.

In one embodiment, the location pairing module 250 additionally or alternatively filters the locations chains by demographics of the users (such as age, gender, or income of the users), and aggregates chains of locations visited by users belonging to similar demographic groups. The location module 240 may also aggregate chains of locations visited within a similar period of time, such as the last year. In another embodiment, the location pairing module 250 filters the location chains by context in which the users visited the locations, such as whether a user is traveling. For example, the location pairing module 250 filters the location chains to select locations in a given geographic region (e.g., a city) that are visited by users who are visiting the region, as opposed to users who reside in (that is, are frequently located in) the region. In this case, the location pairing module 250 may filter the location chains to select chains associated with users who recently traveled at least a threshold distance or who are more frequently located at least a threshold distance away from the locations in the chains. Other characteristics of the users may be used to filter the location chains.

Based on the aggregated chains of locations visited by users of the online system 140, the location pairing module 250 identifies pairs of locations for which there is a high probability a user will travel to a second location in the pair if the user visited a first location in the pair. That is, the location pairing module 250 determines a conditional probability of a user visiting a second location given that the user visited a first location. In one embodiment, the location pairing module 250 models each location chain as a Markov chain, in which the probability of a user visiting a location in the chain is dependent only on the location immediately preceding the location in the chain. If the conditional probability is greater than a threshold, the location pairing module 250 pairs the second location to the first location.

In general, the location pairing module 250 pairs locations based on a number of occurrences of the locations in a set of location chains visited by users of the online system 140. In one embodiment, the location pairing module 250 uses one or more association rules, such as support and confidence, to determine the conditional probability of a user visiting a second location given that the user visited a first location. Given a location A, the location module 240 determines a support of the location A in the aggregated location chains by determining a percentage of the aggregated location chains including location A. Similarly, given locations A and B, the location module 240 determines a support for both locations in the aggregated location chains by determining a percentage of the chains including both location A and location B. The location pairing module 250 determines a confidence for a pairing between locations A and B by calculating a support for locations A and B in the aggregated location chains (that is, a percentage of the location chains including both location A and location B) and dividing the support for the union of A and B by a support for location A in the aggregated chains. In one embodiment, the location pairing module 250 pairs locations A and B if the confidence of A and B is greater than a threshold. Alternatively, the location pairing module 250 may determine a support for location B in the set of location chains including location A, and pair locations A and B if the support for B in chains including A is greater than a threshold. Other association rules may additionally or alternatively be used to determine pairings between locations.

The aggregated set of location chains used to determine support and confidence for two locations may be an entire set of location chains extracted from location histories of users of the online system 140, or may be a filtered set of chains. As described above, the location pairing module 250 may filter the location chains to select sets of chains associated with users having a particular characteristics or including locations with particular characteristics. After filtering the location chains by a demographic characteristic of the users or a characteristic of the locations, the location pairing module 250 determines associations between locations based on the number of occurrences of the locations in the filtered set. Thus, the location pairing module 250 may determine multiple pairings between locations, where each pairing is associated with a characteristic of the locations or users who visit the locations. For example, for a location pair associated with a particular user demographic characteristic, the pair includes a first location and a second location to which there is a high probability a user having the demographic characteristic will travel if the user is located at the first location.

The pairings between locations generated by the location pairing module 250 may be ordered or unordered pairings. For example, one embodiment of the location pairing module 250 determines a first probability of users of the online system 140 visiting location B after visiting location A, and determines a second probability of users visiting location A after visiting location B. In this case, the location pairing module 250 may determine a percentage of the aggregated chains of locations containing location B after location A, and a percentage of the aggregated chains containing location A after location B. In another embodiment, the location pairing module 250 determines a single probability of locations A and B occurring in the same chain, regardless of the order in which they occur. In this case, the location pairing module 250 may determine a percentage of the aggregated chains containing both locations A and B, in either order.

Furthermore, the location pairing module 250 may use any occurrences of two locations in the same chain to determine pairings, or may only consider immediately successive locations to determine pairings. For example, if a location chain includes, in order, locations A, C, and B, the location pairing module 20 may not count the chain as an occurrence of locations A and B since locations A and B were not visited in succession. In another embodiment, the location pairing module 250 counts a location chain as including locations A and B if the user visited locations A and B within a threshold amount of time (in spite of visiting location C between locations A and B).

Figure 2B:
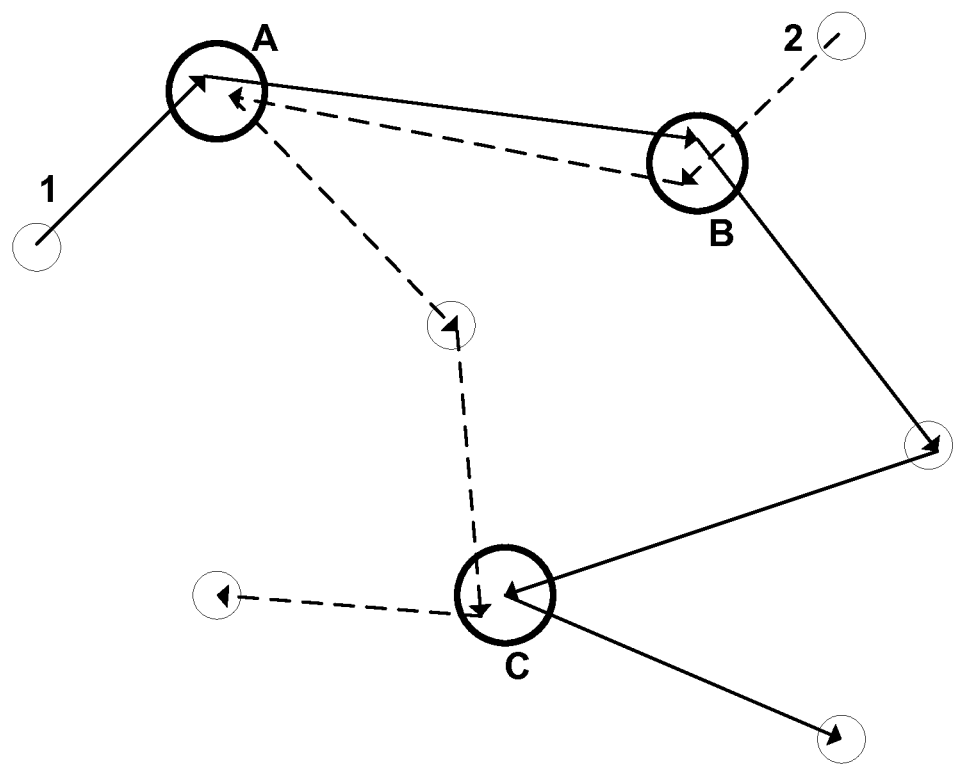
FIG. 2B illustrates example locations visited by users of a social networking system.

FIG. 2B illustrates example locations visited by two users of the online system 140. In the example of FIG. 2B, user 1 visited, in order, locations A, B, and C, as well as other locations. User 2 visited, in order, locations B, A, and C, as well as other locations. Accordingly, the location pairing module 250 extracts a chain {A, B, . . . , C} from the location history of user 1 and extracts a chain {B, A, . . . , C} from the location history of user 2. The locations selected for inclusion in the chains may have been filtered according to size of the locations, demographics of the users 1 and 2, or other factors. In one embodiment, the location pairing module 250 pairs locations A and B, B and C, and A and C based on the presence of the respective locations in the extracted chains. In another embodiment, the location pairing module 250 pairs locations A and B as the locations were visited consecutively by both users, but does not pair location C to location A or location B as the users each visited a different location prior to visiting location C.

The ad targeting module 255 selects advertisements to send to users of the online system 140 based on the location pairs generated by the location pairing module 250. For example, if a user is located at a first location in a pair, the ad targeting module 255 sends the user an advertisement for the second location in the pair. Alternatively, the ad targeting module 255 may send a user an advertisement for the second location in the pair if the user has previously visited the first location. In another example, the ad targeting module 255 selects a group coupon for the two locations in the pair for presentation to a user if the user has visited one of the locations in the pair. In yet another example, the ad targeting module 255 recommends an advertiser targeting advertisements to users who have visited a first location in a pair also target users who have visited the second location in the pair.

In one embodiment, if the location pairing module 250 generated pairings associated with different user characteristics, the ad targeting module 255 also uses characteristics of a user to select an advertisement for the user. For example, if the location pairing module 250 determined pairs of locations associated with particular demographic characteristics, the ad targeting module 255 identifies a demographic characteristic of the user, determines one or more pairs of locations associated with the user's demographic characteristic, and uses the determined pairs to select an advertisement for presentation to the user. In one embodiment, the selected advertisement is provided to the user by the web server 260.

The web server 260 links the online system 140 via the network 120 to the one or more client devices 110, as well as to the one or more third party systems 130. The web server 140 serves web pages, as well as other web-related content, such as JAVA®, FLASH®, XML and so forth. The web server 260 may receive and route messages between the online system 140 and the client device 110, for example, instant messages, queued messages (e.g., email), text messages, short message service (SMS) messages, or messages sent using any other suitable messaging technique. A user may send a request to the web server 260 to upload information (e.g., images or videos) that are stored in the content store 210. Additionally, the web server 260 may provide application programming interface (API) functionality to send data directly to native client device operating systems, such as IOS®, ANDROID™, WEBOS® or RIM®.

In one embodiment, the web server 260 sends information about the location pairings to systems associated with the locations (e.g., the third party systems 130). For example, the web server 260 sends a location an identifier of other locations paired to the location. For locations associated with a common entity (such as departments within a department store), the web server 260 may send identifiers of the paired locations to the entity. The entity can use the pairings to make business or marketing decisions, such as selecting products to sell, determining effective layouts of the entity's location, or informing advertising campaigns of the entity.

Targeting Advertising Based on Paired Locations

Figure 3:
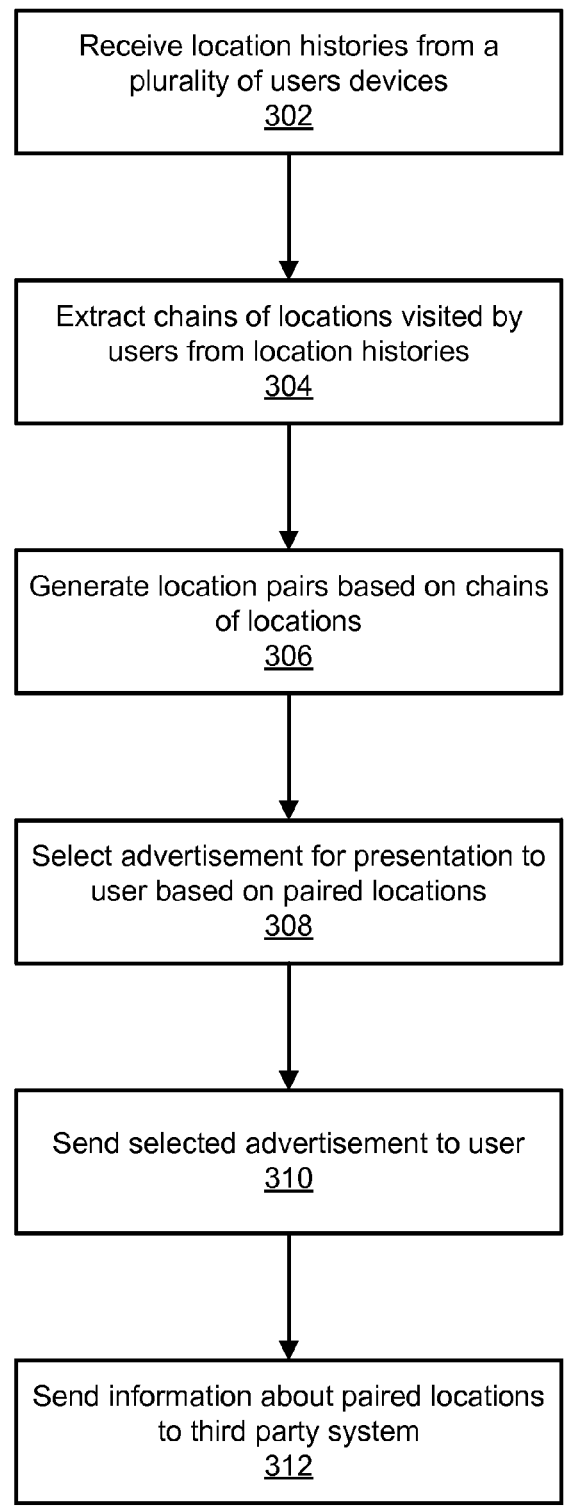
FIG. 3 is a flowchart illustrating a process for pairing locations, in accordance with an embodiment of the invention.

FIG. 3 is a flowchart illustrating one embodiment of a process for targeting advertisements to users based on paired locations. In one embodiment, the steps of the process are performed by the online system 140. Other embodiments of the process include different, fewer, or additional steps, or may perform the steps in different orders.

The online system 140 receives 302 location histories from a plurality of user devices 110 used by users of the online system 140. If a user has opted in to location tracking, the online system 140 periodically receives the location of a user device 110 of the user (as detected by any of a variety of location sensors used by the user device 110), and stores the locations in a profile of the user. In one embodiment, the online system 140 aggregates the sampled location data and identifies an entity or object located at each sample. The online system 140 therefore generates a list of locations at which a user device 110 was located and, based on time stamps of the samples, determines how long the device was located at each location.

The online system 140 extracts 304 chains of locations visited by users from the location histories. A chain of locations is a sequential list of locations visited by a user, and may include one or more locations of a similar type. In one embodiment, the online system 140 identifies one or more locations visited by a user of the online system within a threshold length of time, and extracts the one or more locations as a chain of locations visited by the user. The user may be determined to be located at a particular location if the user's device is located at the location for at least a threshold amount of time.

Based on the chains of locations, the online system 140 generates 306 pairings between locations. Two locations are paired if there is a high probability a user will travel to a second location if the user visited a first location. In one embodiment, the online system 140 determines associations between two locations based on a number of occurrences of the two locations in a plurality of the chains of locations. For example, if users commonly visit a particular grocery store after visiting a particular gym, the online system 140 may determine there is a high probability a user who visits the gym will also visit the grocery store. The online system 140 may filter the location chains based on a variety of factors, such as location type, demographics of the users associated with the location chains, or a context in which the users visited the locations in the chains, and use an occurrence of two locations in the filtered set of location chains to determine a probability of a user visiting both locations.

The online system outputs one or more location predictions based on the location pairs. In one embodiment, the online system 140 uses the pairings between locations to select 308 an advertisement for presentation to a user and sends 310 the selected advertisement to the user. In one embodiment, if location A is paired to location B, the online system 140 presents an advertisement for location B to a user currently located at location A (or vice versa). For example, if the online system 140 pairs a particular grocery store to a particular gym, the online system 140 may present an advertisement for the grocery store to a user located at the gym. Alternatively, if a user has previously visited the gym, the online system 140 may present an advertisement for the grocery store to the user. In another embodiment, the online system 140 sends users advertisements for paired locations. For example, if the online system 140 selects an advertisement for location A for presentation to a user (based on targeting criteria of the advertisement, for example), the online system 140 also sends the user an advertisement for location B paired to location A. In this example, if the online system 140 selects an advertisement for a hotel in city A (because the user is determined to be planning a trip to city A, for example) and city A is paired to city B, the online system 140 also selects an advertisement for city B for presentation to the user. As another example, the online system 140 sends a user a joint coupon for locations A and B. In this example, if two departments of a department store are paired, the online system 140 may select a coupon valid in the two departments to send to a user. In yet another example, the online system 140 recommends an advertiser targeting ads to user who have visited a first location in a pair also target ads to users who have visited a second location in the pair. In this example, if a restaurant and a movie theater are paired, the online system 140 recommends an advertiser targeting ads to users visiting the movie theater also target ads to users visiting the restaurant.

In one embodiment, the online system 140 sends 312 information about the location pairs to entities associated with the locations (e.g., via a third party system 130). The entities may use the location pairs to inform marketing strategies, create ad targeting specifications, and the like. For example, the online system 140 provides a department store with information about pairs of locations visited by users of the online system 140 who visit the department store. The location pairs provide the department store with information about how customers move throughout the store (for example, visiting the shoe department after visiting the housewares department), enabling the department store to improve the layout of the store or market products to customers.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving location information from a plurality of user devices used by users of an online system, the location information identifying a plurality of different locations at which each of the user devices was located;

extracting from the location information a plurality of chains of locations visited by each of plurality of users of the online system, each chain of locations including two or more locations visited by a respective user, wherein extracting the plurality of chains of locations comprises: identifying two or more locations wherein (1) the user was located at both of the two or more locations within a first maximum threshold length of time, and (2) the user was located at each of the two or more locations for at least a second minimum threshold amount of time, and extracting the two or more locations as a chain of locations visited by the user;

generating one or More location pairs using the chains of locations, each location pair including a first location and a second location, wherein generating the one or more location pairs comprises: determining an association between two location in the chains of locations based on a number of occurrences of the first location and the second location in common chains of the extracted plurality of chains of locations, and pairing the two locations responsive to the association being greater than a third threshold;

determining that a viewing user previously visited one of the locations in a location pair; and responsive to the determination, selecting a content item for the other location in the location for presentation to the user.

2. The method of claim 1, further comprising: filtering the extracted chains of locations based on one or more demographic characteristics of the plurality of users; wherein the generating is based only on the filtered chains of locations.

3. The method of claim 1, further comprising: filtering the extracted chains of locations based on a context in which a corresponding user visited the locations in each chain; wherein the generating is based only on the filtered chains of locations.

4. The method of claim 1, wherein selecting the content item for presentation to the user comprises: responsive to the user being located at one of the locations in a location pair, selecting a content item for the other location in the location pair for presentation to the user.

5. The method of claim 1, wherein selecting the content item for presentation to the user comprises: determining the user previously visited one of the locations in a location pair; and responsive to the determination, selecting a content item for the other location in the location pair for presentation to the user.

6. The method of claim 1, wherein selecting the content item for presentation to the user comprises: selecting a content item associated with the first location and the second location in a location pair for presentation to the user.

7. The method of claim 1, wherein the first threshold is adjusted depending on a type of one or more of the locations in the chain.

8. A computer program product comprising a non-transitory computer-readable storage medium having instructions encoded thereon that, when executed by a processor, cause the processor to:

receive location information from a plurality of user devices used by users of an online system, the location information identifying a plurality of different locations at which each of the user devices was located;

extract from the location information a plurality of chains of locations visited by each of plurality of users of the online system, each chain of locations including two or more locations visited by a respective user, wherein extracting the plurality of chains of locations comprises: identifying two or more locations wherein (1) the user was located at both of the two or more locations within a first maximum threshold length of time, and (2) the user was located. at each of the two or more locations for at least a second minimum threshold amount of time, and extracting the two or more locations as a chain of locations visited by the user;

generate one or more location pairs using the chains of locations, each location pair including a first location and a second location, wherein generating the one or more location pairs comprises: determining an association between two location in the chains of locations based on a number of occurrences of the first location and the second location in common chains of the extracted plurality of chains of locations, and pairing the two locations responsive to the association being greater than a third threshold;

determining that a viewing user previously visited one of the locations in a location pair; and responsive to the determination, selecting a content item for the other location in the location for presentation to the user.

9. The computer program product of claim 8, further comprising instructions that when executed by the processor cause the processor to: filter the extracted chains of locations based on one or more demographic characteristics of the plurality of users; wherein the processor generates the one or more location pairs based only on the filtered chains of locations.

10. The computer program product of claim 8, further comprising instructions that when executed by the processor cause the processor to: filter the extracted chains of locations based on a context in which a corresponding user visited the locations in each chain; and wherein the processor generates the one or more location pairs based only on the filtered chains of locations.

11. The computer program product of claim 8, wherein the instructions causing the processor to select the content item for presentation to the user comprise instructions that when executed by the processor cause the processor to: responsive to the user being located at one of the locations in a location pair, select a content item for the other location. in the location pair for presentation to the user.

12. The computer program product of claim 8, wherein the instructions causing the processor to select the content item for presentation to the user comprise instructions that when executed by the processor cause the processor to: determine the user previously visited one of the locations in a location pair; and responsive to the determination, select the content item for the other location in the location pair for presentation to the user.

13. The computer program product of claim 8, wherein the instructions causing the processor to select the content item for presentation to the user comprise instructions that when executed by the processor cause the processor to: select a content item associated with the first location and the second location in a location pair for presentation. to the user.

14. The computer program product of claim 8, wherein the first threshold is adjusted depending on a type of one or more of the locations in the chain.

* * * * *

UNITED STATES PATENT AND TRADEMARK OFFICE
CERTIFICATE OF CORRECTION

PATENT NO. : 10,078,852 B2  Page 1 of 1
APPLICATION NO. : 14/586306
DATED : September 18, 2018
INVENTOR(S) : Andrea Vaccari It is certified that error appears in the above-identified patent and that said Letters Patent is hereby corrected as shown below:

In the Claims
Column 15, Line 8 In Claim 1, after "comprises:", insert --¶--
Column 15, Line 13 In Claim 1, after "and", insert --¶--
Column 15, Line 15 In Claim 1, delete "More" and insert --more-- therefor
Column 15, Line 18 In Claim 1, after "comprises:", insert --¶--
Column 15, Line 22 In Claim 1, after "and", insert --¶--
Column 15, Line 30 In Claim 2, after "comprising:", insert --¶--
Column 15, Line 32 In Claim 2, after "users;", insert --¶--
Column 15, Line 34 In Claim 3, after "comprising:", insert --¶--
Column 15, Line 36 In Claim 3, after "chain;", insert --¶--
Column 15, Line 40 In Claim 4, after "comprises:", insert --¶--
Column 15, Line 45 In Claim 5, after "comprises:", insert --¶--
Column 15, Line 47 In Claim 5, after "and", insert --¶--
Column 15, Line 51 In Claim 6, after "comprises:", insert --¶--
Column 16, Lines 2-3 In Claim 8, after "comprises:", insert --¶--
Column 16, Line 6 In Claim 8, delete "located." and insert --located-- therefor
Column 16, Line 8 In Claim 8, after "and", insert --¶--
Column 16, Line 13 In Claim 8, after "comprises:", insert --¶--
Column 16, Line 17 In Claim 8, after "and", insert --¶--
Column 16, Line 28 In Claim 9, after "to:", insert --¶--
Column 16, Line 30 In Claim 9, after "users;", insert --¶--
Column 16, Line 36 In Claim 10, after "to:", insert --¶--
Column 16, Line 38 In Claim 10, after "and", insert --¶--
Column 16, Line 44 In Claim 11, after "to:", insert --¶--
Column 16, Line 46 In Claim 11, delete "location." and insert --location-- therefor
Column 16, Line 51 In Claim 12, after "to:", insert --¶--
Column 16, Line 53 In Claim 12, after "and", insert --¶--
Column 16, Line 59 In Claim 13, after "to:", insert --¶--
Column 16, Line 61 In Claim 13, delete "presentation." and insert --presentation-- therefor Signed and Sealed this
Third Day of September, 2019

Andrei Iancu
*Director of the United States Patent and Trademark Office*